(12) United States Patent
Morimoto

(10) Patent No.: US 7,603,919 B2
(45) Date of Patent: Oct. 20, 2009

(54) FORCE MEASURING APPARATUS

(75) Inventor: Hideo Morimoto, Yamatokoriyama (JP)

(73) Assignee: Nitta Corporation, Osaka (JP)

( * ) Notice: Subject to any disclaimer, the term of this patent is extended or adjusted under 35 U.S.C. 154(b) by 86 days.

(21) Appl. No.: 12/068,724

(22) Filed: Feb. 11, 2008

(65) Prior Publication Data
US 2008/0190216 A1  Aug. 14, 2008

(30) Foreign Application Priority Data
Feb. 13, 2007  (JP)  .............. 2007-031611

(51) Int. Cl.
*G01L 1/16* (2006.01)
(52) U.S. Cl. ............... 73/862.68; 73/862.453; 73/862.392
(58) Field of Classification Search .............. 73/862.68, 73/862.392, 862.453
See application file for complete search history.

(56) References Cited

U.S. PATENT DOCUMENTS 4,794,805 A * 1/1989 Carney et al. .......... 73/862.452
4,803,888 A * 2/1989 Choquet ................ 73/862.392
4,934,224 A * 6/1990 Brown ........................... 82/47
5,039,834 A * 8/1991 Obara et al. ............. 219/69.12
5,249,472 A * 10/1993 Brown .................... 73/862.472

FOREIGN PATENT DOCUMENTS

JP   A-2002-90239   3/2002

* cited by examiner

*Primary Examiner*—Max Noori
(74) *Attorney, Agent, or Firm*—Oliff & Berridge, PLC (57) ABSTRACT

A force measuring apparatus includes first fixed electrodes disposed in one direction in one plane so as to be distant from each other; second fixed electrodes disposed in the one direction in a plane opposed to the one plane, so as to be distant from each other and opposed to the respective first fixed electrodes; and movable electrodes movable in the one direction. The apparatus further includes a force receiving portion to receive an external force and thereby move the movable electrodes in the one direction so as to change the overlapped area between each first fixed electrode and the corresponding movable electrode and the overlapped area between each second fixed electrode and the corresponding movable electrode. The apparatus measures the magnitude of the force applied to the force receiving portion based on the changes in the capacitance values of the capacitance elements.

7 Claims, 7 Drawing Sheets

FORCE MEASURING APPARATUS

BACKGROUND OF THE INVENTION

1. Field of the Invention

The present invention relates to a force measuring apparatus for measuring the magnitude of a force externally applied.

2. Description of Related Art

A force measuring apparatus is known for measuring the tension of a string or a wire. For example, Japanese Patent Unexamined Publication No. 2002-90239 discloses a tension detecting apparatus as a force measuring apparatus. In this apparatus, two distant points of a wire are hooked on attachment portions of the apparatus. The wire is hitched to a bent portion of the apparatus disposed in between the two points of the wire. The bent portion perpendicularly protrudes beyond a straight line extending through the two points of the wire. In this state, the force applied to the bent portion is measured with a strain gauge to measure the tension of the wire

SUMMARY OF THE INVENTION

In the process of making a thread, a number of fibers must be bundled with keeping the tensions of the fibers uniform so that unevenness is not generated on the resulting thread. For this purpose, it is required to measure the tension of each fiber. However, when the tension detecting apparatus disclosed in the above publication is used for measuring the tension of each fiber, the apparatus may excessively respond also to vibration of the device on which the apparatus is disposed, or vibration of the fiber caused by that knurls of the natural fiber hit the bent portion of the apparatus. This is because the tension detecting apparatus using the strain gauge has high responsibility as 1 kHz or more. There is possibility that the magnitude of the tension can not accurately be measured. In addition, when a number of fibers are bundled, the fibers are disposed at narrow intervals. Therefore, such a tension detecting apparatus provided for each fiber must be thin.

An object of the present invention is to provide a thin force measuring apparatus that can accurately measure the magnitude of a force.

According to the present invention, a force measuring apparatus includes a plurality of first fixed electrodes disposed in one direction in one plane so as to be distant from each other; a plurality of second fixed electrodes disposed in the one direction in a plane opposed to the one plane, so as to be distant from each other and opposed to the respective first fixed electrodes; and a plurality of movable electrodes movable in the one direction. Each movable electrode cooperates with a first fixed electrode and a second fixed electrode to form capacitance elements. The apparatus further includes a force receiving portion to receive an external force and thereby move the plurality of movable electrodes in the one direction so as to change the overlapped area between each first fixed electrode and the corresponding movable electrode and the overlapped area between each second fixed electrode and the corresponding movable electrode. The apparatus measures the magnitude of the force applied to the force receiving portion on the basis of the changes in the capacitance values of the plurality of capacitance elements.

According to the invention, a force externally applied to the force receiving portion changes the capacitance values of the capacitance elements constituted by the first and second electrodes and the movable electrodes. Thus, the magnitude of the externally applied force can be measured on the basis of the quantities of the changes in the capacitance values.

When a force externally applied to the force receiving portion has a component in a direction perpendicular to the one plane, the movable electrodes are moved in the direction perpendicular to the one plane. The movement in the direction also brings about changes in the capacitance values of the capacitance elements constituted by the first and second electrodes and the movable electrodes. However, when the movement of the movable electrodes in the direction perpendicular to the one plane increases one of the capacitance values of the capacitance elements constituted by the first fixed electrodes and the corresponding movable electrodes and the capacitance values of the capacitance elements constituted by the second fixed electrodes and the corresponding movable electrodes, the other of them decreases by substantially the same quantity as the quantity of the increase. Therefore, by obtaining the sum of them, the force externally received in one direction can accurately be measured even when the movable electrodes are moved perpendicularly to the one plane.

In addition, the construction in which the first and second fixed electrodes are opposed to the movable electrodes can realize a thin force measuring apparatus. Therefore, even when a number of substances to be measured are arranged at narrow intervals, force measuring apparatuses can be disposed on the respective substances to measure the magnitudes of the tensions.

As described above, when the tension of a fiber or the like is measured by using a force measuring apparatus having too high responsibility, the apparatus may respond also to vibration of the device on which the apparatus is disposed, or vibration of the fiber caused by knurls of the natural fiber. There is possibility that the magnitude of the tension can not accurately be measured. In the present invention, however, because the tension is measured on the basis of changes in capacitance values caused by the displacements of the movable electrodes, the apparatus has not so high responsibility and it is hard to respond to the above-described factors. Thus, the magnitude of the tension can accurately be measured.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
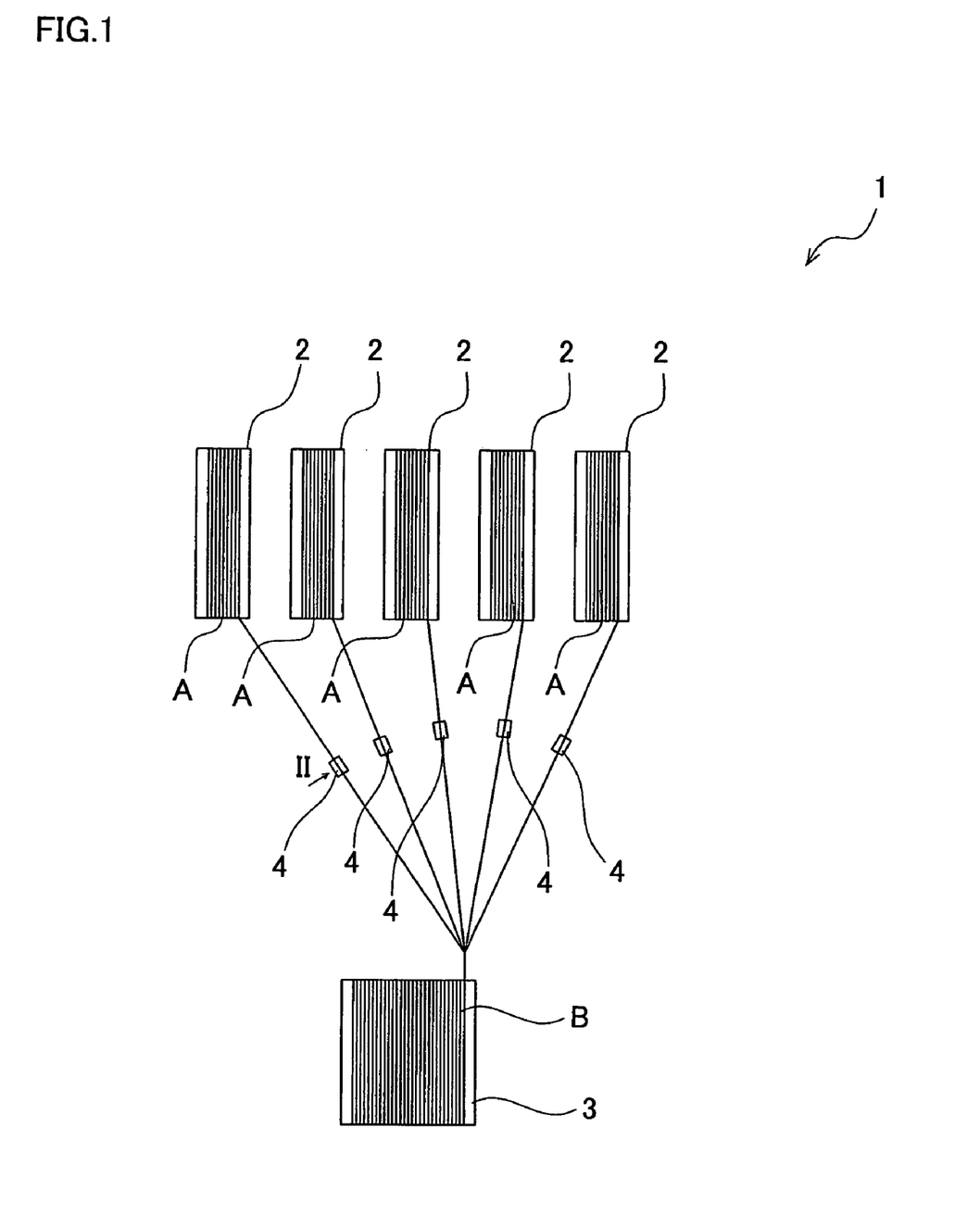
FIG. 1 is a schematic view of a thread making machine including tension measuring apparatuses according to an embodiment of the present invention.

Hereinafter, an embodiment of the present invention will be described. FIG. 1 is a schematic view of a thread making machine including tension measuring apparatuses according to the embodiment of the present invention.

As shown in FIG. 1, the thread making machine 1 includes a number of bobbins 2, a bobbin 3, and a number of tension measuring apparatuses 4 as force measuring apparatuses. A fiber A is wound on each bobbin 2. A thread B made by bundling fibers A is wound on the bobbin 3. The tension measuring apparatuses 4 are provided so as to correspond to the respective bobbins 2 to measure the magnitudes of the tensions of the fibers A drawn from the respective bobbins 2.

In the thread making machine 1, the fibers A are drawn from the respective bobbins 2 so as to uniformize the tensions measured by the tension measuring apparatuses 4. The drawn fibers A are bundled to make a thread B. The made thread B is wound on the bobbin 3. Afterward, the thread B wound on the bobbin 3 is processed by twisting and so on.

Figure 2:
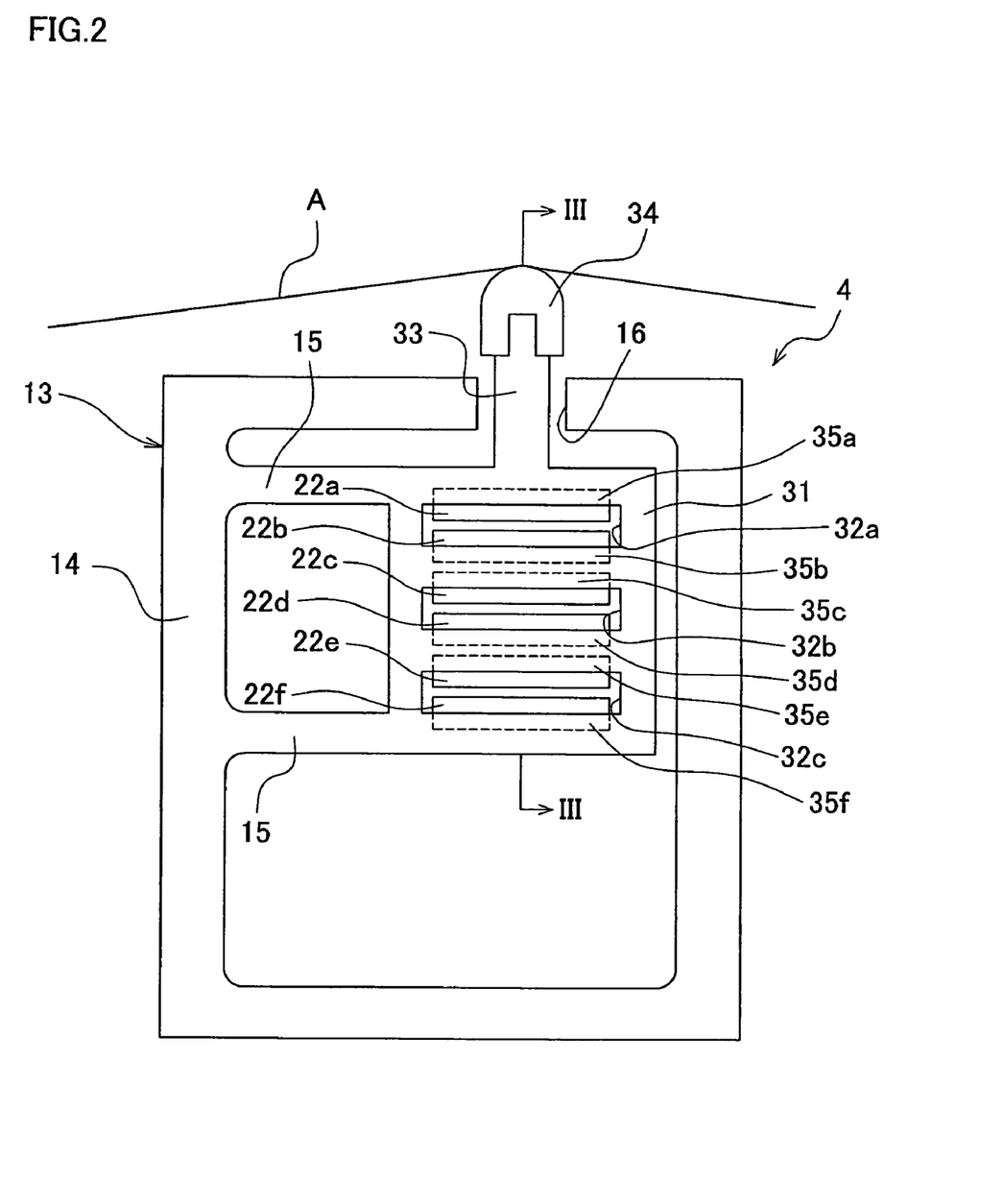
FIG. 2 is a side view of a tension measuring apparatus viewed from the direction of an arrow II in FIG. 1.
Figure 3:
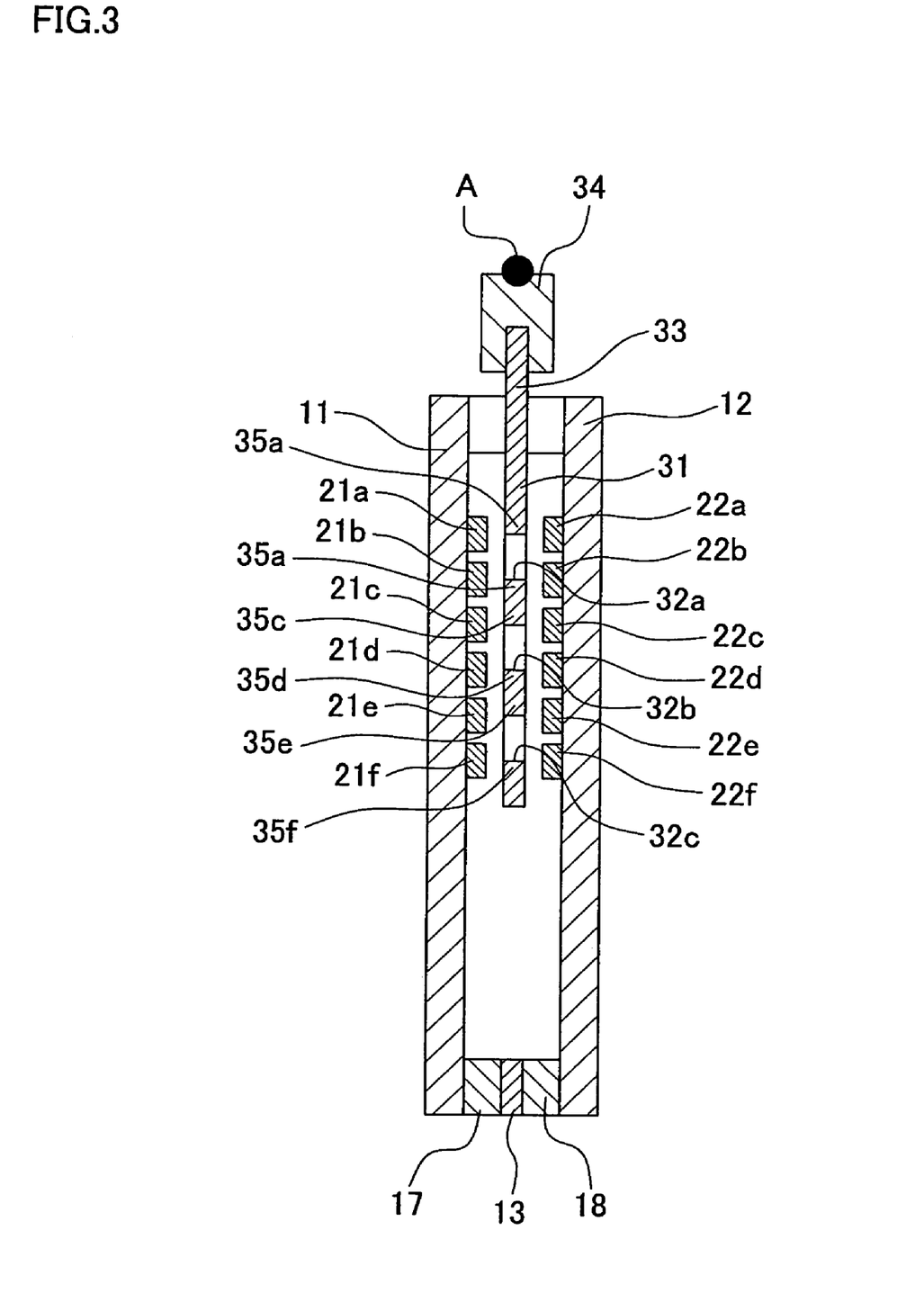
FIG. 3 is a sectional view taken along line III-III in FIG. 2.

Next, each tension measuring apparatus 4 will be described. FIG. 2 is a side view of a tension measuring apparatus in FIG. 1 when viewed from the direction of an arrow II. FIG. 3 is a sectional view taken along line III-III in FIG. 2. In FIG. 2, a substrate 11 as will be described later is omitted.

In the tension measuring apparatus 4, as shown in FIGS. 2 and 3, a substrate 13 is disposed in between a substrate 11 and a substrate 12. An outer edge portion of the substrate 11 is bonded to an outer edge portion of the substrate 13 through an interposed spacer 17. An outer edge portion of the substrate 12 is bonded to an outer edge portion of the substrate 13 through an interposed spacer 18.

The substrate 11 is an about 0.8 to 1.6 mm-thick substantially rectangular plate made of an insulating material such as a resin. On the surface of the substrate 11 facing the substrate 13, six substantially rectangular electrodes 21a to 21f as first fixed electrodes are arranged vertically in FIG. 3, that is, in one direction, so as to be distant from each other. The electrodes 21a to 21f are covered with a not-shown insulating film.

The substrate 12 is an about 0.8 to 1.6 mm-thick substantially rectangular plate made of the same insulating material as the substrate 11. The substrate 12 is disposed so as to be opposed to the substrate 11. On the surface of the substrate 12 facing the substrate 13, six substantially rectangular electrodes 22a to 22f as second fixed electrodes are arranged vertically in FIGS. 2 and 3 so as to be distant from each other and opposed to the respective electrodes 21a to 21f on the substrate 11. The electrodes 22a to 22f are covered with a not-shown insulating film.

The substrate 13 is a plate made of a conductive material such as metal. The substrate 13 is made up of an outer frame 14, two supporting members 15, and a plate member 31. The outer frame 14 is substantially rectangular to form the profile of the substrate 13. The supporting members 15 and the plate member 31 are disposed in a region surrounded by the outer frame 14. An opening 16 is formed at the upper end of the outer frame 14.

The supporting members 15 extend rightward in FIG. 2, that is, perpendicularly to the one direction, from the left end part of the outer frame 14 in FIG. 2 at a position near the upper end of the outer frame 14 and at a position near the center of the outer frame 14, respectively. The right ends of the supporting members 15 are connected to the left end of the plate member 31 at the upper and lower ends of the plate member 31, that is, positions of one end of the plate members 31 distant from each other in one direction. The plate member 31 is thus supported by the outer frame 14 through the supporting members 15.

The plate member 31 is substantially rectangular in a plan view. The plate member 31 has three substantially rectangular through-holes 32a to 32c arranged vertically in FIGS. 2 and 3. In FIGS. 2 and 3, the through-hole 32a is distantly opposed to substantially lower halves of the electrodes 21a and 22a and substantially upper halves of the electrodes 21b and 22b; the through-hole 32b is distantly opposed to substantially lower halves of the electrodes 21c and 22c and substantially upper halves of the electrodes 21d and 22d; and the through-hole 32c is distantly opposed to substantially lower halves of the electrodes 21e and 22e and substantially upper halves of the electrodes 21f and 22f.

Therefore, substantially upper halves of the electrodes 21a and 22a are distantly opposed to a region 35a neighboring upward the through-hole 32a of the plate member 31; substantially lower halves of the electrodes 21b and 22b are distantly opposed to a region 35b neighboring downward the through-hole 32a of the plate member 31; substantially upper halves of the electrodes 21c and 22c are distantly opposed to a region 35c neighboring upward the through-hole 32b of the plate member 31; substantially lower halves of the electrodes 21d and 22d are distantly opposed to a region 35d neighboring downward the through-hole 32b of the plate member 31; substantially upper halves of the electrodes 21e and 22e are distantly opposed to a region 35e neighboring upward the through-hole 32c of the plate member 31; and substantially lower halves of the electrodes 21f and 22f are distantly opposed to a region 35f neighboring downward the through-hole 32c of the plate member 31.

Figure 4:
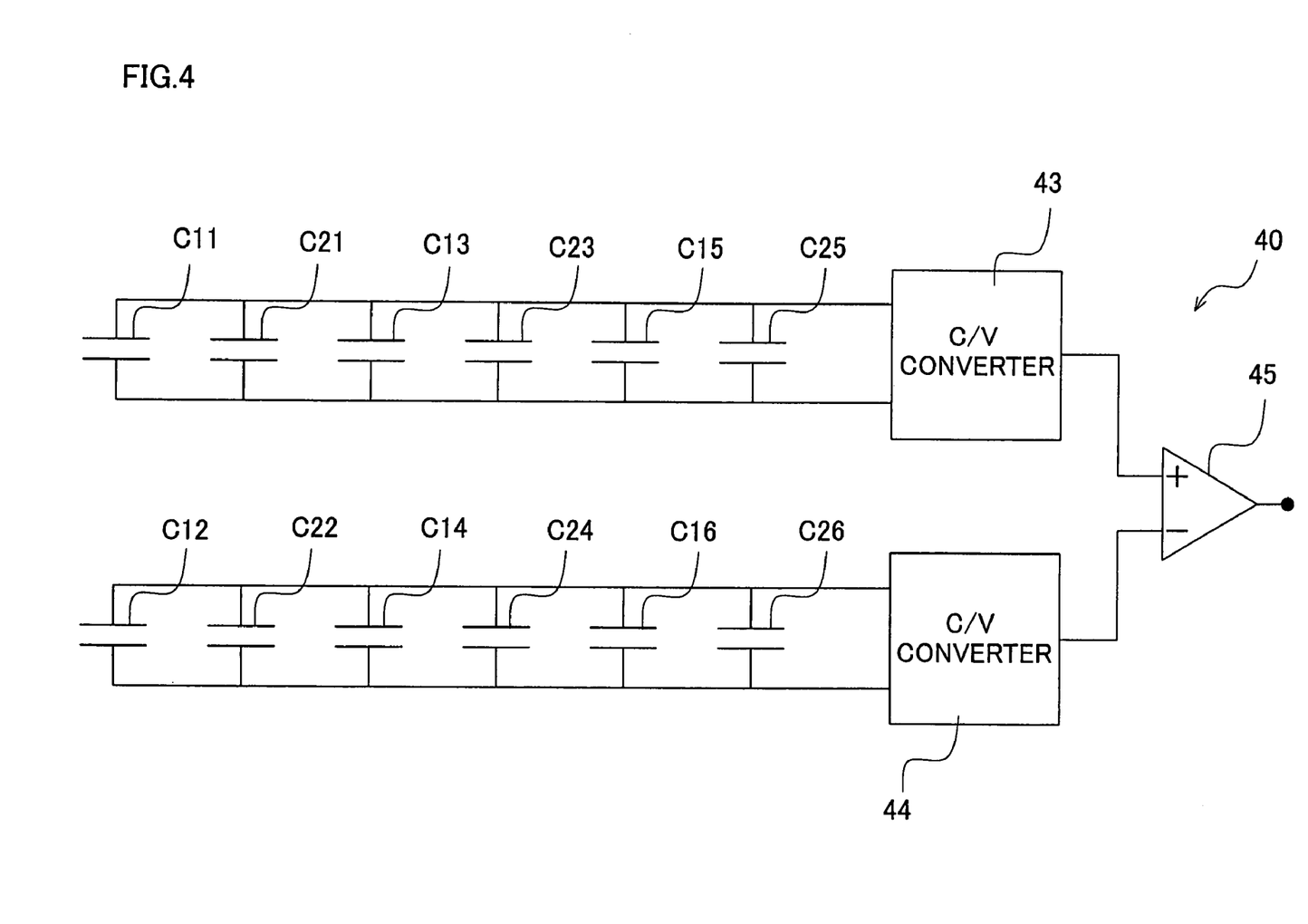
FIG. 4 is a block circuit diagram showing a construction of a tension calculating circuit.

Thus, the electrodes 21a and 22a and the region 35a; the electrodes 21b and 22b and the region 35b; the electrodes 21c and 22c and the region 35c; the electrodes 21d and 22d and the region 35d; the electrodes 21e and 22e and the region 35e; and the electrodes 21f and 22f and the region 35f form capacitance elements C11 to C16 and C21 to C26 as shown in FIG. 4. The regions 35a to 35f on vertically both sides of the respective through-holes 32a to 32c of the plate member 31 in FIG. 2 correspond to movable electrodes of the present invention. By forming the through-holes 32a to 32c in the plate member 31, the regions 35a to 35f serving as the movable electrodes can easily be formed.

The plate member 31 has an extension portion 33 extending upward in FIGS. 2 and 3 from the upper end of the plate member 31 to pass through the opening 16. A force receiving portion 34 is provided at the upper end of the extension portion 33. Thus, the force receiving portion 34 is connected to the plate member 31. When the tension of a fiber A is measured, the upper end of the force receiving portion 34 is pressed to the fiber A.

When the upper end of the force receiving portion 34 is pressed to the fiber A, the force receiving portion 34 receives a downward force from the fiber A. The force moves the plate member 31 downward. At this time, because the plate member 31 is supported by the supporting members 15 at the upper and lower ends of the left end of the plate member 31, the plate member 31 is surely moved downward. The downward movement of the plate member 31 increases the areas in which the electrodes 21a and 22a are opposed to the region 35a; the electrodes 21c and 22c are opposed to the region 35c; and the electrodes 21e and 22e are opposed to the region 35e while decreasing the areas in which the electrodes 21b and 22b are opposed to the region 35b; the electrodes 21d and 22d are opposed to the region 35d; and the electrodes 21f and 22f are opposed to the region 35f. This increases the capacitance values of the capacitance elements C11, C13, C15, C21, C23, and C25, as shown in FIG. 4, constituted by the electrodes 21a and 22a and the region 35a; the electrodes 21c and 22c and the region 35c; and the electrodes 21e and 22e and the region 35e while decreasing the capacitance values of the capacitance elements C12, C14, C16, C22, C24, and C26, as shown in FIG. 4, constituted by the electrodes 21b and 22b and the region 35b; the electrodes 21d and 22d and the region 35d; and the electrodes 21f and 22f and the region 35f. The quantity of the increase in each area is substantially equal to the quantity of the decrease in each area, that is, the quantity of the increase in each capacitance value is substantially equal to the quantity of the decrease in each capacitance value.

Two electrodes 21a and 21b as first fixed electrodes, two electrodes 22a and 22b as second fixed electrodes, and two regions 35a and 35b as movable electrodes correspond to electrodes included in one electrode group of the present invention. Also, two electrodes 21c and 21d, two electrodes 22c and 22d, and two regions 35c and 35d correspond to electrodes included in one electrode group of the present invention; and two electrodes 21e and 21f, two electrodes 22e and 22f, and two regions 35e and 35f correspond to electrodes included in one electrode group of the present invention. The above-described three electrode groups are arranged vertically in FIGS. 2 and 3.

When the direction of the force applied to the force receiving portion 34 pressed to the fiber A shifts horizontally in FIG. 3 from a vertical line in FIG. 3, the plate member 31 is moved not only downward in FIG. 3 but also horizontally in FIG. 3. When the plate member 31 is moved leftward in FIG. 3, this decreases the distances between the electrodes 21a to 21f and the regions 35a to 35f while increasing the distances between the electrodes 22a to 22f and the regions 35a to 35f. This increases the capacitance values of the capacitance elements C11 to C16, as shown in FIG. 4, constituted by the electrodes 21a to 21f and the regions 35a to 35f while decreasing by substantially the same quantities the capacitance values of the capacitance elements C21 to C26, as shown in FIG. 4, constituted by the electrodes 22a to 22f and the regions 35a to 35f. Conversely, when the plate member 31 is moved rightward, this decreases the capacitance values of the capacitance elements C11 to C16, as shown in FIG. 4, constituted by the electrodes 21a to 21f and the regions 35a to 35f while increasing by substantially the same quantities the capacitance values of the capacitance elements C21 to C26, as shown in FIG. 4, constituted by the electrodes 22a to 22f and the regions 35a to 35f.

FIG. 4 shows a tension calculating circuit for calculating tension. As shown in FIG. 4, the tension calculating circuit 40 includes capacitance elements C11 to C16 and C21 to C26, C/V converters 43 and 44, and a subtracter 45. In FIG. 4, the capacitance elements C11 to C16 are respectively constituted by the electrodes 21a to 21f and the regions 35a to 35f; and the capacitance elements C21 to C26 are respectively constituted by the electrodes 22a to 22f and the regions 35a to 35f. The circuit construction for the C/V converters 43 and 44 and the subtracter 45, which is the part of the tension calculating circuit 40 other than the capacitance elements C11 to C16 and C21 to C26, can be made into a thickness of about 1 mm. Therefore, provision of the C/V converters 43 and 44 and the subtracter 45 dose not considerably increase the size of the tension calculating circuit 40.

In the tension calculating circuit 40, the C/V converter 43 outputs a voltage corresponding to the sum of the capacitance values of the capacitance elements C11, C21, C13, C23, C15, and C25 while the C/V converter 44 outputs a voltage corresponding to the sum of the capacitance values of the capacitance elements C12, C22, C14, C24, C16, and C26. The subtracter 45 outputs a voltage corresponding to the difference between the voltage output from the C/V converter 43 and the voltage output from the C/V converter 44.

In the tension calculating circuit 40, as described above, when a force is applied to the force receiving portion 34 to move the plate member 31 downward in FIGS. 2 and 3, this increases the capacitance values of the capacitance elements C11, C21, C13, C23, C15, and C25 while decreasing by substantially the same quantities the capacitance values of the capacitance elements C12, C22, C14, C24, C16, and C26. When a force is applied to the force receiving portion 34 to move the plate member 31 leftward in FIG. 3, this increases the capacitance values of the capacitance elements C11 to C16 while decreasing by substantially the same quantities the capacitance values of the capacitance elements C21 to C26. When a force is applied to the force receiving portion 34 to move the plate member 31 rightward in FIG. 3, this decreases the capacitance values of the capacitance elements C11 to C16 while increasing by substantially the same quantities the capacitance values of the capacitance elements C21 to C26.

From the above facts, it is understood that respectively summing the capacitance values of the capacitance elements C11 and C21, the capacitance values of the capacitance elements C13 and C23, and the capacitance values of the capacitance elements C15 and C25, cancels the changes in capacitance value caused by the horizontal movement of the plate member 31 in FIG. 3, and thus only the change in capacitance value caused by the downward movement of the plate member 31 can be detected. Also, respectively summing the capacitance values of the capacitance elements C12 and C22, the capacitance values of the capacitance elements C14 and C24, and the capacitance values of the capacitance elements C16 and C26, cancels the changes in capacitance value caused by the horizontal movement of the plate member 31 in FIG. 3, and thus only the change in capacitance value caused by the downward movement of the plate member 31 can be detected. Therefore, either of the C/V converters 43 and 44 outputs a voltage corresponding to the quantity of the downward movement of the plate member 31 in FIGS. 2 and 3.

When the plate member 31 is moved downward in FIGS. 2 and 3, this increases the capacitance values of the capacitance elements C11, C21, C13, C23, C15, and C25. The sum of the increased capacitance values is input to the C/V converter 43. On the other hand, the downward movement of the plate member 31 decreases the capacitance values of the capacitance elements C12, C22, C14, C24, C16, and C26. The sum of the decreased capacitance values is input to the C/V converter 44. This increases the quantity of the change in the capacitance value input to each of the C/V converters 43 and 44 in comparison with a case in which only one electrode group of the present invention is provided. This improves the sensitivity of the tension measuring apparatus 4. By obtaining in the subtracter 45 the difference between the voltage output from the C/V converter 43 and the voltage output from the C/V converter 44, the magnitude of the force applied to the force receiving portion 34 is measured on the basis of the quantity of the above increase in capacitance value and the quantity of the above decrease in capacitance value. Thus, the magnitude of the tension can accurately be measured.

In the above-described embodiment, a force applied to the force receiving portion 34 changes the capacitance values of the capacitance elements C11 to C16 constituted by the electrodes 21a to 21f and the regions 35a to 35f, and the capacitance values of the capacitance elements C21 to C26 constituted by the electrodes 22a to 22f and the regions 35a to 35f. Thus, the magnitude of the tension can be measured on the basis of the change in capacitance value.

When a force applied to the force receiving portion 34 has a horizontal component in FIG. 3, the plate member is moved horizontally in FIG. 3. The horizontal movement of the plate member also changes the capacitance values of the capacitance elements C11 to C16 constituted by the electrodes 21a to 21f and the regions 35a to 35f, and the capacitance values of the capacitance elements C21 to C26 constituted by the electrodes 22a to 22f and the regions 35a to 35f. However, when one of them increases, the other decreases by substantially the same quantity. Therefore, by obtaining the sum of them, only the change in capacitance value caused by the downward movement of the plate member 31 can be detected.

In the tension measuring apparatus 4, the substrates 11 to 13 are disposed so as to be opposed to each other. This can reduce the thickness of the tension measuring apparatus, that is, the horizontal length in FIG. 3. Therefore, even when a number of fibers A are disposed at narrow intervals as shown in FIG. 1, a tension measuring apparatus can be provided for each fiber A.

Because the tension of each fiber A is measured on the basis of a change in capacitance value, the responsibility is not so high as about 100 Hz. It is hard to respond to vibration of the device on which the tension measuring apparatus 4 is disposed, or vibration of the fiber A due to knurls of the fiber A. Thus, the magnitude of the tension of the fiber A can accurately be measured.

Because three electrode groups of the present invention are provided so as to be arranged in one direction, a change in capacitance value is obtained in each electrode group. This increases the change in capacitance value in the whole tension measuring apparatus 4. This improves the sensitivity of the tension measuring apparatus 4.

By forming the through-holes 32a to 32c in the plate member 31, the regions 35a to 35f are formed on both vertical sides of the through-holes 32a to 32c. Thus, the movable electrodes of the present invention can easily be formed.

The force receiving portion 34 is provided at the upper end of the extension portion 33 extending upward from the upper end of the plate member 31, and the plate member 31 is supported by two supporting members 15 at the upper and lower ends of the left end of the plate member 31. Thus, when a force is applied to the force receiving portion 34, the plate member 31 is surely moved downward in FIGS. 2 and 3.

Next, various modifications of the above-described embodiment will be described. In the modifications, components having the same constructions as in the above-described embodiment are denoted by the same reference numerals as in the above-described embodiments, respectively, and the description thereof will be arbitrarily omitted.

Figure 5:
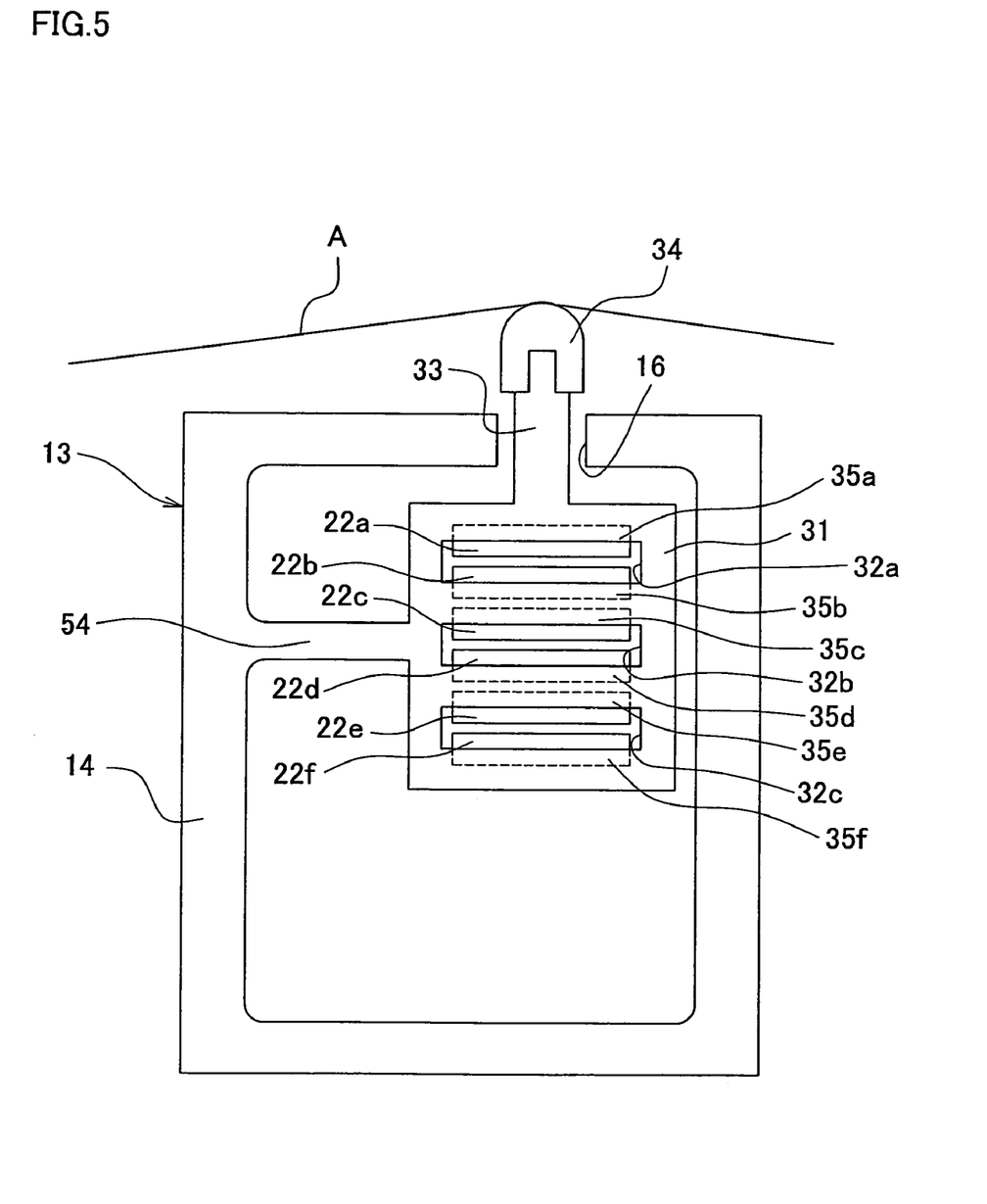
FIG. 5 is a side view of Modification 1 corresponding to FIG. 2.

In the above-described embodiment, two supporting members 15 are connected to the upper and lower ends of the left end of the plate member 31. However, the number of supporting members and the connection positions to the plate member 31 are not limited to those of the above-described embodiment. In Modification 1, as shown in FIG. 5, one supporting member 54 is connected to the substantially vertical center of the left end of the plate member 31.

In this Modification 1, when a force is applied to the force receiving portion 34, the plate member 31 is moved along an arc around the connection position between the supporting member 54 and the outer frame 14. However, because the quantity of the movement of the plate member 31 is small, the quantity of the horizontal movement of the plate member 31 in FIG. 5 is vanishingly small. Thus, even in this Modification 1, the plate member 31 is moved substantially vertically in FIG. 5. Therefore, in the same manner as the above-described embodiment, the magnitude of the tension of the fiber A can be measured.

Figure 6:
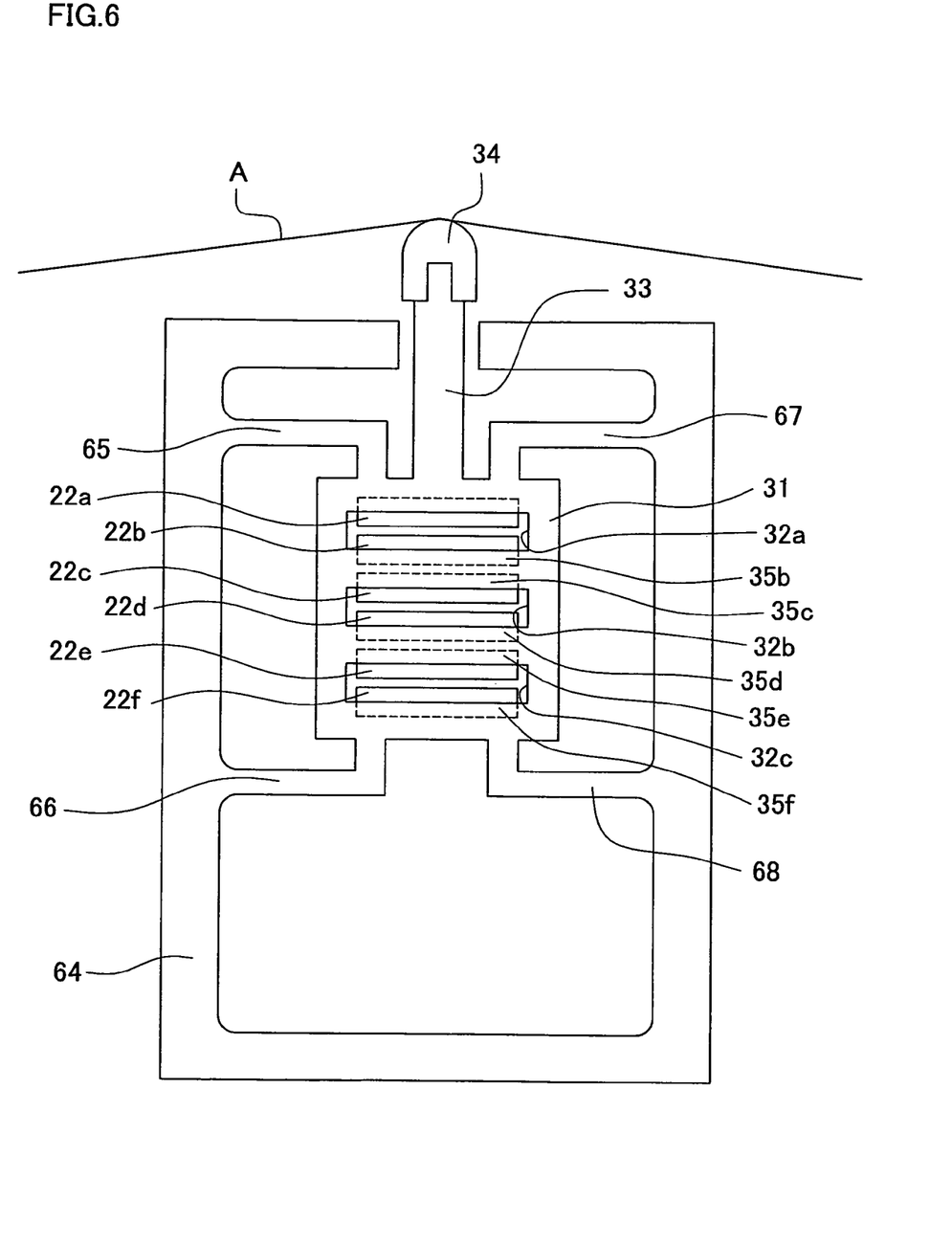
FIG. 6 is a side view of Modification 2 corresponding to FIG. 2.

In Modification 2, as shown in FIG. 6, four supporting members 65, 66, 67, and 68 are provided. The supporting members 65 and 66 extend rightward in FIG. 6 from the left end of an outer frame 64. The respective supporting members 65 and 66 are bent downward and upward at their right ends, and connected to positions of the upper and lower ends of the plate member 31 near the left end of the plate member 31. On the other hand, the supporting members 67 and 68 extend leftward in FIG. 6 from the right end of the outer frame 64. The respective supporting members 67 and 68 are bent downward and upward at their left ends, and connected to positions of the upper and lower ends of the plate member 31 near the right end of the plate member 31. Thus, the four supporting members 65 to 68 are disposed so as to be vertically and horizontally symmetrical in FIG. 6, that is, symmetrical with respect to straight lines extending in one direction and in a direction perpendicularly to the one direction on the plate member 31. In this Modification 2, the plate member 31 is supported from vertically and horizontally both sides in FIG. 6. Thus, when a force is applied to the force receiving portion 34, the plate member 31 is surely moved downward in FIG. 6. The number of supporting members is not limited to four. An even number of supporting members, that is, two or more than six supporting members, may be disposed so as to be vertically and horizontally symmetrical.

Figure 7:
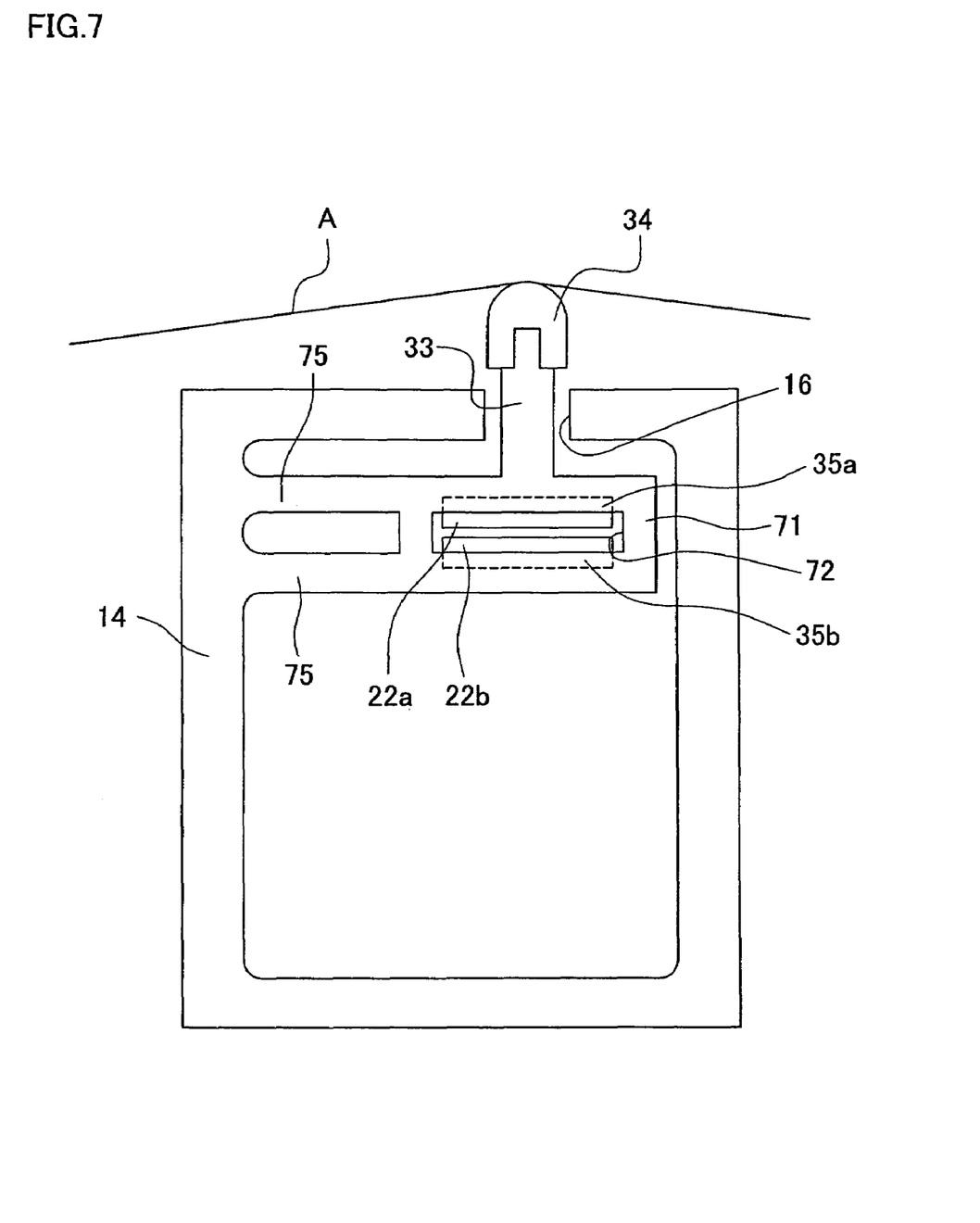
FIG. 7 is a side view of Modification 3 corresponding to FIG. 2.

In the above-described embodiment, three electrode groups of the present invention are provided that are constituted by the electrodes 21a to 21f and 22a to 22f and the regions 35a to 35f. However, the number of electrode groups is not limited to that. For example, in Modification 3, as shown in FIG. 7, only two electrodes 21a and 21b; and 22a and 22b are formed on the respective substrates 11 and 12. A plate member 71 is shorter than that of the above-described embodiment. Only one through-hole 32a is formed in the plate member 71. The plate member 71 is supported by two supporting members 75 that extend rightward from the left end of the outer frame 14 and are connected to the upper and lower ends of the left end of the plate member 71. That is, in this Modification 3, the tension measuring apparatus has only one electrode group of the present invention.

Also in this Modification 3, like the above-described embodiment, when a force is applied to the force receiving portion 34, the plate member 71 is moved downward in FIG. 7. This increases the capacitance values of the capacitance elements constituted by the electrodes 21a and 22a and the region 35a while decreasing the capacitance values of the capacitance elements constituted by the electrodes 21b and 22b and the region 35b. Thus, the magnitude of the tension of the fiber A can be measured on the basis of the changes in the capacitance values.

In the above-described embodiment and modifications, each electrode group of the present invention is constituted by a number of electrodes disposed on the substrates 11 and 12 and a number of regions of the plate member 31 opposed to the respective electrodes. In another modification, however, such an electrode group may not be constituted. For example, only one electrode may be formed on each of the substrates 11 and 12, and the plate member is disposed so as to partially overlap the two electrodes. Also in this modification, when a force is applied to the force receiving portion 34, the plate member is moved downward to change the capacitance values of the capacitance elements constituted by the electrodes and the plate member. Thus, the magnitude of the tension of the fiber A can be measured on the basis of the changes in the capacitance values.

In the above-described embodiment and modifications, the plate member is made of a metallic material so that part of the plate member serves as movable electrodes of the present invention. In a modification, however, electrodes to serve as movable electrodes may be formed on the surfaces of the plate member, which has no through-hole, facing the substrates 11 and 12 so that the electrodes on the plate member are partially opposed to the respective electrodes formed on the substrates 11 and 12.

In the above-described embodiment and modifications, the present invention is applied to a tension measuring apparatus for measuring the magnitude of the tension of a fiber A. However, the present invention is never limited to that. The present invention can be applied to a force measuring apparatus for measuring the magnitude of a force other than tension.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A force measuring apparatus comprising:
    a plurality of first fixed electrodes disposed in one direction in one plane so as to be distant from each other;
    a plurality of second fixed electrodes disposed in the one direction in a plane opposed to the one plane, so as to be distant from each other and opposed to the respective first fixed electrodes;
    a plurality of movable electrodes movable in the one direction, each movable electrode cooperating with a first fixed electrode and a second fixed electrode to form capacitance elements; and
    a force receiving portion to receive an external force and thereby move the plurality of movable electrodes in the one direction so as to change the overlapped area between each first fixed electrode and the corresponding movable electrode and the overlapped area between each second fixed electrode and the corresponding movable electrode,
    the apparatus measuring the magnitude of the force applied to the force receiving portion on the basis of the changes in the capacitance values of the plurality of capacitance elements.

2. The apparatus according to claim 1, wherein the apparatus comprises an electrode group comprising two first fixed electrodes, two second fixed electrodes, and two movable electrodes, and
    an external force received by the force receiving portion increases the sum of the capacitance values of the capacitance elements constituted by one first and second fixed electrode of the electrode group and one movable electrode of the electrode group opposed to the one first and second electrodes while decreasing the sum of the capacitance values of the capacitance elements constituted by the other first and second fixed electrode of the electrode group and the other movable electrode of the electrode group opposed to the other first and second electrodes.

3. The apparatus according to claim 2, wherein a plurality of electrode groups are disposed in the one direction.

4. The apparatus according to claim 2, wherein the apparatus further comprises a conductive plate member disposed parallel to the one plane and having a through-hole, and
    two movable electrodes of the electrode group are formed by two portions of the plate member sandwiching the through-hole in the one direction.

5. The apparatus according to claim 4, wherein the force receiving portion is connected to the plate member, and
    the plate member is supported by a supporting member extending perpendicularly to the one direction in a plane parallel to the plate member.

6. The apparatus according to claim 5, wherein the apparatus comprises two supporting members, and
    the two supporting members are connected to one end of the plate member at positions distant from each other in the one direction.

7. The apparatus according to claim 5, wherein the apparatus comprises a plurality of supporting members, and
    the plurality of supporting members are disposed symmetrically with respect to a straight line extending in the one direction and a straight line extending perpendicularly to the one direction.

* * * * *